United States Patent
Palmer

[11] 4,017,962
[45] Apr. 19, 1977

[54] INTEGRATED ARRAY OF OPTICAL FIBERS AND THIN FILM OPTICAL DETECTORS, AND METHOD FOR FABRICATING THE SAME

[75] Inventor: John P. Palmer, Pomona, Calif.

[73] Assignee: General Dynamics Corporation, Pomona, Calif.

[22] Filed: July 23, 1976

[21] Appl. No.: 708,164

Related U.S. Application Data

[62] Division of Ser. No. 591,200, June 27, 1975, Pat. No. 3,987,300.

[52] U.S. Cl. .............................. 29/572; 29/576 C; 29/578; 29/589; 29/592; 96/36.2
[51] Int. Cl.² .......................................... B01J 17/00
[58] Field of Search ............ 29/572, 578, 580, 584, 29/589, 592, 576; 96/36.2; 250/227

[56] References Cited
UNITED STATES PATENTS

| | | | |
|---|---|---|---|
| 3,757,127 | 9/1973 | Dhaka | 250/227 |
| 3,963,920 | 6/1976 | Palmer | 250/227 |
| 3,968,564 | 7/1976 | Springthorpe | 29/589 |

*Primary Examiner*—W. Tupman
*Attorney, Agent, or Firm*—Henry M. Bissell; Edward B. Johnson

[57] ABSTRACT

An integrated array of optical fibers and thin film optical detectors is formed by constructing an array of optical detectors in registration with light-emitting portions of the optical fibers. A cadmium sulfide semiconducting film, grown upon a silicon substrate, is covered with an optically transparent and electrically conductive tin dioxide ground plane film. An array of optical fibers, having light-emitting ends in substantial contact with the conductive file, is mounted to a frame attached to such film. The frame and optical fibers are epoxy encapsulated above the conductive film; the substrate is then removed and photo resist applied over the newly exposed semiconducting film surface. Light transmitted directly through the optical fibers, and through the light-emitting portions thereof in contact with the conductive film, is used to activate, from a rear side, only those portions of the photo resist layer which are in exact registration with the light-emitting ends of the optical fibers. After removal of the activated portions of photo resist, a film of platinum is deposited through the resulting photo resist windows onto exposed portions of the semiconductor film, thereby forming photovoltaic diodes. Aluminum contacts are applied over the platinum and, after removal of the remaining photo resist, conductors are bonded to the contacts and the ground plane film. The resulting integrated assembly may be packaged with other electronic components in a hermetically sealed package. A method for fabricating an integrated array of optical fibers and thin film optical detectors is thereby provided.

10 Claims, 14 Drawing Figures

INTEGRATED ARRAY OF OPTICAL FIBERS AND THIN FILM OPTICAL DETECTORS, AND METHOD FOR FABRICATING THE SAME

This is a division, of application Ser. No. 591,200 filed June 27, 1975, now U.S. Pat. No. 3,987,300.

BACKGROUND OF THE INVENTION

1. Field of the Invention

This invention relates to the field of optoelectronics, and interfacing of optical fibers and thin film optical detectors; more particularly, it relates to apparatus and methods for providing registration between individual optical fibers and individual optical detectors.

2. Description of the Prior Art

Optical and electronic elements are commonly combined to form composite systems which may be referred to as optoelectronic systems; typcial examples are military target-seeking systems and systems for reading coded markings on railroad cars, wearing apparel tags and food packages. In many optoelectronic systems the optical image must be transferred from a receiving point or focal plane to another part of the system for conversion into electronic signals, usually because electronic circuitry near the receiving point or focal plane causes electrical interference with the optical-to-electronic conversion, or because there is insufficient space for the electronics associated with such conversion.

Development of optical fibers has greatly facilitated image transfer in optoelectronic systems. By means of bundles of individual optical fibers, each of which may be only a few mils in diameter and thus quite flexible, the visual image may be easily and efficiently conducted from the pick-up point or image plane to a remote location free of spurious electronic noise and where there is adequate space for associated electronics.

Normally at the image end, the fibers comprising a bundle are packed closely together; at the converting or light-emitting end, they may be spread out as necessary to accommodate to light sensitive optical detectors, generally a type of semi-conductor which may be either photovoltaic or photoconductive. If the former, the detectors, when illuminated, act as voltage sources; if the latter, the resistance of the detectors varies with their illumination. In either case, an electric analog of the illumination is provided.

Each individual fiber in a bundle generally transmits only a small portion of the total image and only a very small amount of light is transmitted and emitted by each. Consequently, there must be substantially lossless light transmission from the fiber light emitting portion to the corresponding optical detection element. Stated otherwise, very nearly perfect registration is essential between the light emitting portion of the fiber and its associated detector. Lack of such registration causes partial or complete loss of the light emitted by the fiber, with the result that the detector output signal indicates that its decoded portion of the image was darker than it actually was. While this result may be relatively inconsequential in some applications, in others, such as military target acquisition systems, it may prove critical. Also, such registration permits smaller detector areas with corresponding reduction in capacitance and improvement in response time, important factors in many practical applications.

Obtaining perfect optical registration between a very small diameter optical fiber and a generally equally small optical detector element is extremely difficult. This difficulty is greatly multiplied when, as is usual, a bundle or array of fibers is concerned. The expense of making near perfect registration may thus be prohibitive for many systems. Further, even if good registration is initially achieved, maintaining the registration under normal use conditions, which may include shocks, vibration and thermal stress, is very difficult.

Hargens III (U.S. Pat. No. 3,310,681) discloses forming of optical detectors around longitudinally etched end portions of individual optical fibers. Electrically conducting caps are applied to ends of the detectors, and insulation is applied elsewhere. Two electrical contacts are then made to each detector of each fiber. However, such a method is impractical for use on very small diameter optical fibers because of the considerable mechanical problems involved. In contrast, Dhaka (U.S. Pat. No. 3,747,127) discloses a fixed, integrated array of optical detectors separately formed on a substrate using generally known microelectronic fabrication processes, and utilizing a "flip-chip" technique. A bundle of optical fibers is terminated and clamped in spaced relationship with the associated detector array which must have the same geometrical arrangement as the bundle of optical fibers. Even assuming uniform spacing of the fibers and elements, which is unlikely, slight misalignment between the detector array and the end of the separately mounted fiber bundle, either initially or during use, will cause misalignment between every or nearly every fiber and its corresponding detecting element.

For these and other reasons, there has heretofore, to the applicant's knowledge, been available no practical, relatively simple and inexpensive method or apparatus for providing and maintaining substantially perfect registration between the light-emitting end or portion of very small diameter optical fiber, particularly arrays of such optical fibers, and associated optical detector elements.

SUMMARY OF THE INVENTION

An integrated array of optical fibers and thin film optical detectors comprises an array of optical fibers, having light-emitting portions in substantial contact with a first surface of an optically transparent and electrically conductive, ground plane film and an array of optical detectors formed upon a second surface of the conductive film, and in registration with the optical fiber array. Means are provided for maintaining such registration.

More particularly, the integrated array is formed by mounting, by means of a frame, light-emitting ends of optical fibers in substantial contact with a thin, optically transparent, electrically conductive ground plane film formed upon a semiconducting film which has been grown upon a substrate.

Small quantities of high-viscosity, light-transparent fluid are applied at the interface between the light-emitting ends of the optical fibers and the conductive surface to fill voids therebetween and optimize light transmission and to provide stress relief when the frame, the optical fibers and the surface of the conductive layer are subsequently epoxy encapsulated.

After removing the substrate, a light sensitive emulsion, applied to the newly exposed surface of the semiconducting film, is activated only in regions registered with the light-emitting ends of the optical fibers by light transmitted directly through the fibers. These activated portions of the emulsion are removed to form openings or windows to expose portions of the semiconductor film below. A metallic film is deposited through the windows onto these exposed portions to form photovoltaic diodes which are in exact registration with the light-emitting ends of the optical fibers. To provide for bonding conductors to the diodes, a thin film of contact metal is applied over the previously deposited metallic film. The remaining emulsion is removed, removing the metalization and contact metal film in locations other than the windows. Wires are bonded to the diodes and the ground plane.

A corresponding method of fabricating the integrated array is thereby provided.

In this manner, an array of optical detecting elements is economically and effectively formed in exact registration with the optical fiber array by utilizing light transmitted directly through the optical fibers, regardless of the configuration of the optical array and without need for fabricating masks for the optical detection arrays.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Known semiconductor and microelectronic processing, except where noted, is generally employed in fabricating an optical detector array associated with a plurality of small diameter optical fibers and for the formation of an integrated interface between the optical fibers and the detectors.

Figure 1:
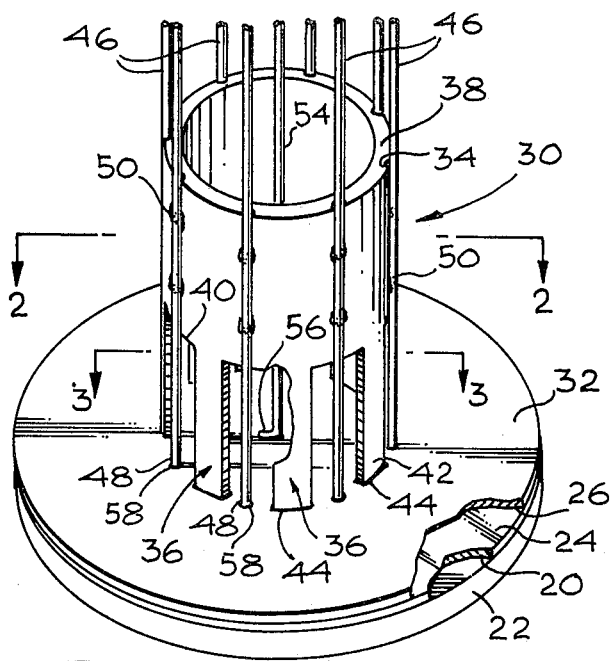
FIG. 1 is a perspective view of one particular arrangement in accordance with the invention, partially broken away to show particular details thereof.

As depicted in FIG. 1, a thin semiconducting film 20, only about 1 micron in thickness and shown greatly exaggerated in thickness, is grown, epitaxially or pseudo-epitaxially, upon a single crystal substrate 22 using conventional techniques. Preferably, the semiconducting film 20 is cadmium sulfide (CdS), but it may alternatively comprise other Group II-IV compounds such as cadmium selenide (CdSe), cadmium telluride (CdTe), zinc selenide (ZnSe), or zinc telluride (ZnTe). Although silicon is preferred for the substrate, other materials, such as germanium, may be used. The substrate is about 1 inch in diameter and about 0.010 inches thick.

Upon an exposed upper surface 24 of the semiconducting film 20 is deposited a thin film 26 of an optically transparent conductive material, such as non-stoichiometric tin dioxide ($SnO_2$), which functions as a ground plane. The film 26 may be formed by oxidizing vacuum deposited tin in air at about 150° C for 30 minutes, or by liquid deposition using a commercial preparation (obtained for example from the Emulsitone Company of New Jersey). The thickness of the conductive film 26 is only about 2000 A and is also shown much exaggerated in FIG. 1.

Figure 2:
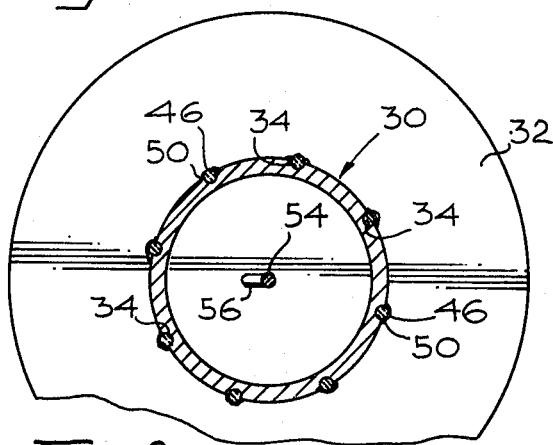
FIG. 2 is a plan view in section, taken along line 2—2 of FIG. 1, showing the optical fibers mounted on the support member.
Figure 3:
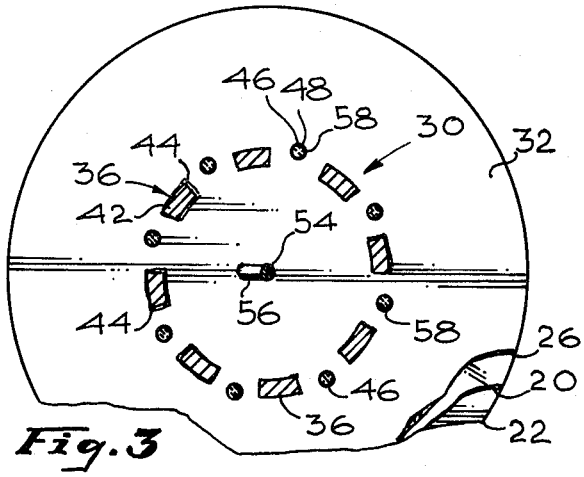
FIG. 3 is another plan view in section, taken along line 3—3 of FIG. 1, showing lower portions of the support member.

Referring now also to FIGS. 2 and 3, a small optical fiber support or mounting frame 30 is attached, as described below, to an exposed upper surface 32 of the conductive film 26. The frame 30 comprises a short section of metal tubing having a plurality of longitudinal optical fiber mounting grooves 34, preferably equally spaced, around the outside of the tube. Cutouts, centered with the grooves 34 and along a lower portion of the frame 30, form a plurality of narrow frame support legs 36 intermediate the grooves. The grooves 34 extend from a top surface 38 of the frame 30 downwardly to a top cutout edge 40. In a typical application, the frame 30 may be about 3/16 inch in diameter, ¼ inch high and have 8 optical fiber mounting grooves 34. The legs 36 may be about 1/32 inch wide and 3/32 inch long or high.

Lower ends 42 of the legs 36 are attached to the surface 32 by small quantities of epoxy cement 44. At least one optical fiber 46, positioned to have a lower light emitting end surface 48 in direct contact with the surface 32, is cemented in each groove 34 with a small quantity of epoxy cement 50. An electrical conductor 52 is directed through the open center of the frame 30 and a lower, bent over end 56 thereof is bonded to the surface 32 for electrical contact therewith. This bonding may be accomplished by use of an electrically conductive cement or by forming a small gold or aluminum bonding pad (not shown) on surface 32 and thermocompression or ultrasonically bonding the end 56 thereto.

To enhance optical transmission from the optical fiber light emitting end surfaces 48 into the subjacent material, small quantities of highly viscous, optically transparent fluid 58, for example, a silicon oil or glycerol, are applied at the emitting end surfaces to penetrate and fill any voids which might exist between the end surfaces and the surface 32. As more particularly described below, the fluid 58 also provides a very important cushioning or stress-relieving function.

Figure 4:
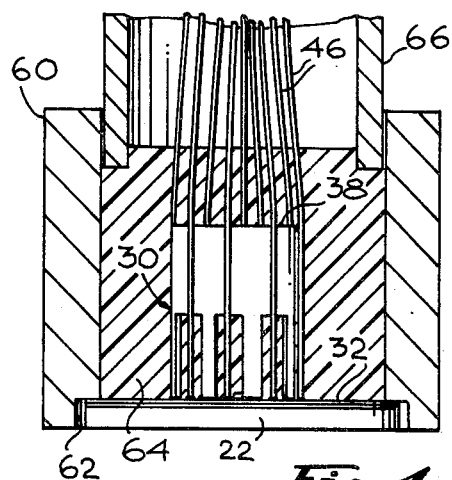
FIG. 4 is a partial sectional view showing epoxy encapsulation of an assembly of the optical fibers, support member and portions of the conductive layer within an encapsulation mold.

After the epoxy cements have fully hardened, preferably at room temperature, the complete assembly—the frame 30, the optical fibers 46 and the composite substrate comprising the substrate 22 and the films 20 and 26—is placed into a mold 60 which has tubular sides and a cutout portion 62 at the bottom for receiving the composite substrate (FIG. 4). The cavity within the frame 30, as well as regions between the frame and the mold 60 and above the upper surface 38 of the frame, are then filled with an epoxy encapsulating resin 64 (for example, Scotchcast 502 available from the 3M Corporation). Preferably the epoxy resin is vacuum outgassed, using a conventional outgassing procedure, before it is poured into the mold 60. A tubular member 66, which is slidable within the mold 60, is inserted at the top of the epoxy while it is still unhardened so that the encapsulated assembly may be easily removed from the mold by a force exerted on the member 66. Curing of the epoxy 64 may be in a conventional oven at 65° C for 5 hours.

Figure 5:
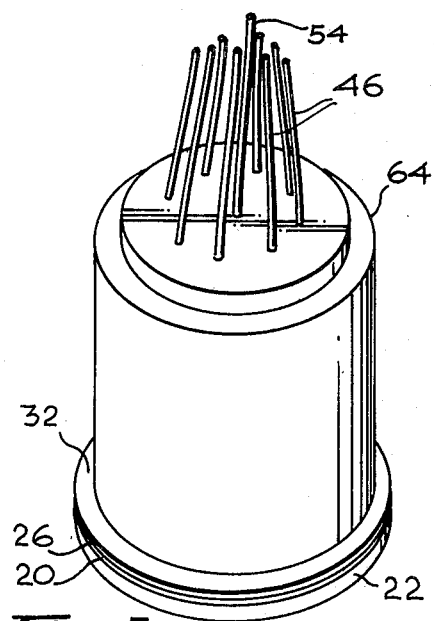
FIG. 5 is a perspective view showing the assembly after encapsulation.
Figure 7:
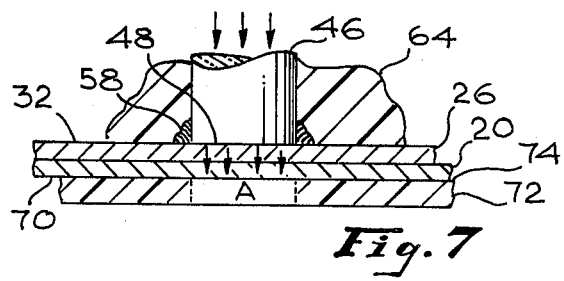
FIG. 7 is a partial vertical sectional view, showing means of activating portions of photoresist directly opposite an optical fiber.

FIG. 5 shows the epoxy encapsulated device removed from the mold 60, all parts of the assembly now being held durably and rigidly in their relative positions by the epoxy 64. As can be seen in FIG. 7, the epoxy 64 does not extend to lower end surfaces 48 of the optical fibers 46 because of the presence of the fluid 58, which thus acts as a cushion protecting the interface between the end surfaces 48 and the surface 32 from stresses caused by the encapsulating process. Also the fluid prevents epoxy from entering between the end surface 48 and the surface 32 where it would reduce light transmission from such end surface.

Figure 6:
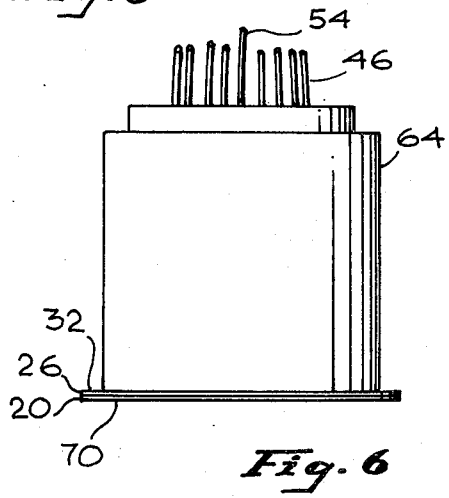
FIG. 6 is an elevational view showing the encapsulated assembly with the substrate removed.

Next, the entire substrate 22 is removed by mechanical separation or cleaving at the interface, or by chemical dissolution (for example, by a solution of potassium ferricyanide) exposing a second, lower surface 70 of the semiconducting film 20 (FIG. 6).

A thin coating 72 of light-sensitive emulsion, or "photoresist," (for example Shipley AZ-1350J, Shipley Co., Inc.) is applied to the second surface 70 (FIG. 7) and allowed to harden, after air drying, at 50° C for 5 minutes. Discreet portions of the photoresist coating 72 are then activated or exposed by transmitting light directly to an inner surface 74 of the photoresist through the optical fibers 46, the conductive film 26 and the semiconducting film 20, thereby exposing only those discreet portions, shown by dashed lines, of the photoresist coating in exact optical registration or alignment with the optical fiber end surfaces 48. It will be appreciated that this will be the situation even if the end surfaces 48 may be inclined relative to the surface 32, and independently of the number and spacings of the optical fibers 46. Further, the necessity for a photoresist exposing mask, or for providing other means for registration, is thereby eliminated, providing a comparatively simple and inexpensive process.

Figure 8:
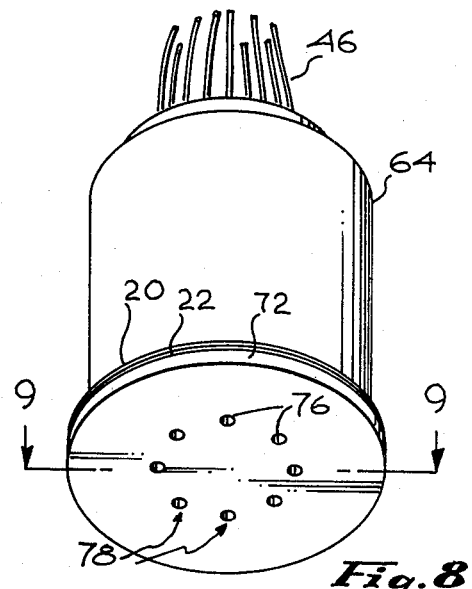
FIG. 8 is a perspective view from the bottom, showing the photoresist layer after removal of activated portions.
Figure 9:
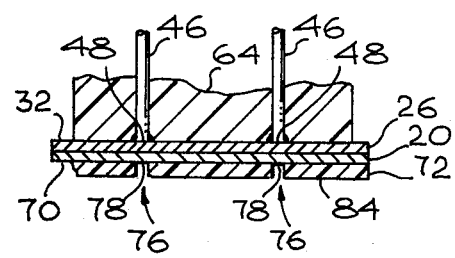
FIG. 9 is a vertical sectional view from line 9—9 of FIG. 8, showing photoresist windows directly opposite optical fibers.

After activation of the portions of photoresist in the above described manner the coating 72 is "developed," enabling the activated regions then to be chemically removed according to well known processes. Since unexposed portions of the coating 72 are not removed, a plurality of openings or windows 76 are formed in the coating, thereby exposing portions 78 of the lower semiconducting film surface 7 (FIGS. 8 and 9). It is emphasized that the windows 76 and the surface portions 78 of the semiconducting film 20 are in exact optical registration with the optical fiber end surfaces 48, because the windows were formed as a direct result of exposing the photoresist by light transmitted through such end surfaces.

Figure 10:
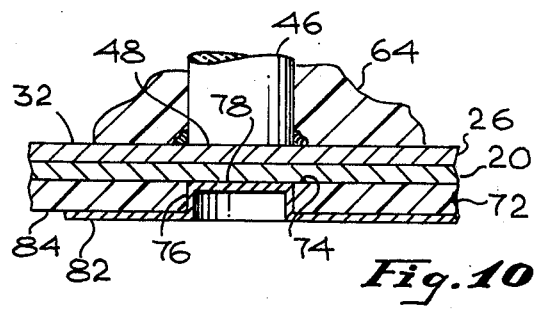
FIG. 10 is a partial vertical sectional view showing deposition of platinum through the photoresist windows.

Subsequent to formation of the photoresist windows 76, a thin metal film 82, preferably about 100A of platinum or other metal having a work function greater than that of the semiconducting film 20, is vacuum deposited across the entire lower surface 84 of the photoresist coating 72 and through the windows 76 to form a coating on the exposed portions 78 of the semiconducting film, thereby forming a comparatively abrupt alloy-type junction or interface between the metal and the semiconductor material (FIG. 10). In this manner, photovoltaic diode, optical detecting elements are formed. Some deviation from standard metalization processes is required to prevent outgassing of the encapsulating epoxy: the platinum is deposited at about room temperature, rather than an elevated temperature, within a vacuum deposition chamber, from a small resistance-heated tungsten source. A short metal deposition time, about 5 minutes, is necessary to prevent substantial heating of the assembly, and the epoxied assembly is preferably heat sinked. Further, the area of the hot area surface of the deposition source is limited to only about 0.2 Cm$^2$, and a source-to-substrate distance of at least 25 cm is maintained.

Figure 11:
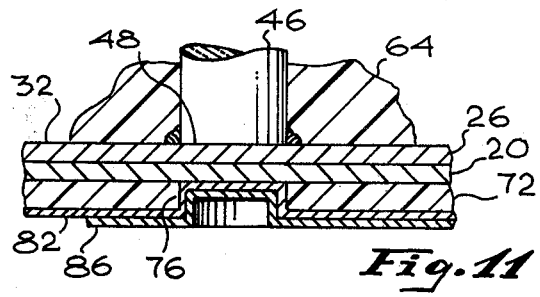
FIG. 11 is a partial vertical sectional view showing deposition of the contact metal through the photoresist windows.

Next, as seen in FIG. 11, upon the film 82 a thin film 86 of electrical contact material, for example, about 4000 A of aluminum, is also vacuum deposited in a manner similar to that described above. The remaining portion of the photoresist layer 72 is then chemically removed using an appropriate commercial stripper, thereby removing all portions of the films 82 and 86 except those portions immediately above the semiconducting surface portions 78. That is, all portions, of the films 82 and 86 other than in locations of the windows 76, are removed.

Figure 12:
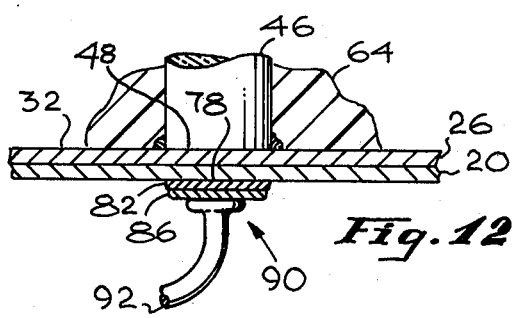
FIG. 12 is a partial vertical sectional view showing the photoresist removed and a conductor bonded by thermal compression to the metal contact area.

An array of discreet optical detector elements 90, or photovoltaic diodes, are in this manner formed upon a common film 20 of semiconducting material, each element 90 being formed in exact optical registration with a light emitting end surface 48 of an optical fiber 46 (FIG. 12).

A conductor 92, for example a 5 mil gold wire, is bonded by conventional thermal compression or ultrasonic bonding techniques to each optical detector element 90. The conductor 54, connected to the conductive film (or ground plane) 26 forms a common second electrical connection for each element 90.

Figure 13:
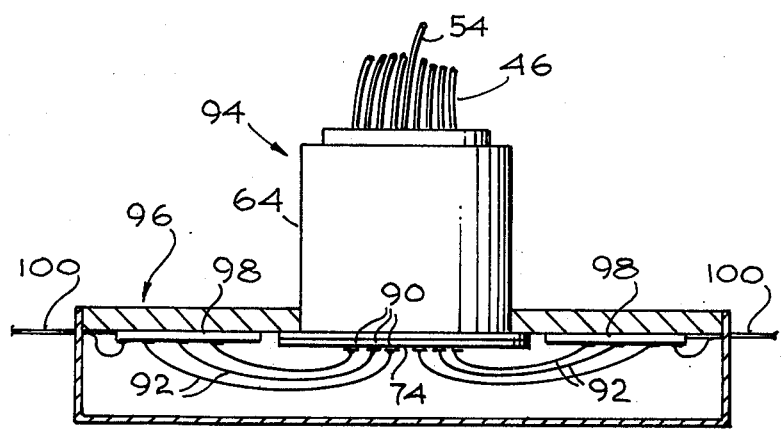
FIG. 13 is a vertical sectional view showing the optoelectronic assembly mounted with other circuit elements in a package.

FIG. 13 illustrates a typical mounting of a completed assembly 94, comprising, for example, an array of eight optical fibers 46 and eight optical detectors 90 registered therewith, in a hermetically sealed package 96. Also mounted in the package 96 are integrated circuit chips 98 which may be preamplifiers, to which the conductors 92 are bonded for interconnection. A completely integrated optoelectronic system or subsystem is thereby provided, light entering the package 96 through the optical fibers 46 and electrical outputs from the package being through package leads 100 and the conductor 54.

Figure 14:
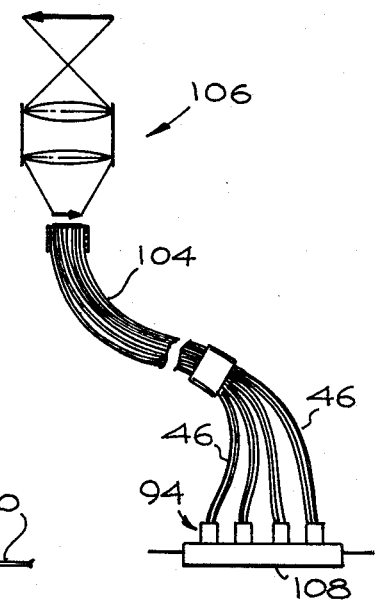
FIG. 14 is a diagram showing a typical optoelectronic system utilizing the described optical detectors and interface structures.

A typical application illustrated in FIG. 14 comprises a system utilizing a bundle 104 of optical fibers 46 terminating at a first end adjacent the focal plane of an optical system 106 from which light is received by the individual fibers. The bundle 104 is routed to a convenient location at which the fibers 46 are separated into a plurality of integrated optical detector assemblies 94 which may be mounted in a common package 108. Outputs for the package 108 are fed into various other electronic units such as amplifiers (not shown).

Although there has been described and illustrated a frame 30 adapted for receiving eight optical fibers, it is to be appreciated that similar frames, not necessarily circular in cross section and mounting a greater or lesser number of optical fibers, may be employed. Nor is the scope of the invention limited to the use of very small diameter optical fibers, it being equally applicable to larger diameter fibers. Further, it is unnecessary that end surfaces at the optical fibers be positioned adjacent the surface 32; it is only necessary that light emitting portions, which may also be side portions, be so positioned.

Although there have been described above specific arrangements of an integrated array of optical fibers and thin film optical detectors, and method for fabricating the same, in accordance with the invention, for the purpose of illustrating the manner in which the invention may be used to advantage, it will be appreciated that the invention is not limited thereto. Accordingly any and all modifications, variations or equivalent arrangements which may occur to those skilled in the art should be considered to be within the scope of the invention as defined in the appended claims.

What is claimed is:

1. A method for registering an optical fiber and a thin film optical detector, which comprises the steps of:
   a. mounting a light emitting portion of an optical fiber in fixed relationship with, and in close proximity to, a first surface of a semiconducting film;
   b. applying a photosensitive emulsion film to a second surface of said semiconducting film;
   c. directing light through said optical fiber and out said light emitting portion thereof to activate only that portion of said emulsion film in registration with said light emitting portion;
   d. removing only said activated portions of said emulsion film and thereby creating a window in said emulsion film in optical registration with said light emitting portion of said optical fiber; and
   e. forming an optical detecting element by depositing a metallic film through said window onto the exposed portion of semiconducting film therebelow.

2. The method as claimed in claim 1 including the step of removing the remaining emulsion film after deposition of the metal film.

3. The method as claimed in claim 1, including the step of forming an optically transparent, electrically conductive ground plane film upon said semiconducting film first surface, said light emitting portions of said optical fibers being adjacent said ground plane film.

4. The method as claimed in claim 3 including the step of attaching a first conductor to the portion of said metal film deposited on said exposed portion of said semiconducting film and attaching a second conductor to said ground plane film.

5. The method as claimed in claim 1 wherein the mounting step includes encapsulating end portions of said optical fiber in an epoxy resin.

6. The method as claimed in claim 1 wherein the mounting step includes the step of introducing a light transmitting fluid into voids between said light transmitting portion of said optical fiber and said semiconducting film therebelow, whereby to optimize optical transmission from said light transmitting portion to said optical detecting element.

7. A method of constructing a thin film optical detector in registration with a light-emitting portion of an optical fiber, which comprises the steps of:
   a. forming a thin, light-sensitive semiconductor film upon the surface of a crystalline substrate,
   b. depositing a thin, optically transparent conductive ground plane film on an exposed first surface of said semiconductor film,
   c. mounting a light emitting portion of an optical fiber in substantial contact with an exposed surface portion of said conductive film, and supporting said optical fiber relative to said conductive film,
   d. removing said substrate to expose a second surface of said semiconductor film,
   e. applying a photosensitive emulsion to said second semiconductor surface,
   f. directing a light through said optical fiber light emitting portion and through both said conductive film and said semiconductor film to activate, from a back surface, only that portion of said emulsion in optical registration with said light emitting portion of said optical fiber,
   g. removing only said activated portion of said emulsion, thereby opening an emulsion window to expose only that portion of said semiconductor film in optical registration with said light emitting portion,
   h. depositing a metallic film onto said exposed portion of said semiconductor film through said emulsion window, to cause said portion of said semiconductor film to become photovoltaic; and
   i. removing portions of said emulsion and therewith portions of said metallic film other than those portions deposited through said windows.

8. The method as claimed in claim 7, including the steps of depositing a thin film metal conductor over said metallic film prior to removal of the remaining photoresist, and bonding a first electrical conductor to that portion of metal conductor film remaining after removal of the remaining photoresist and a second electrical conductor to said conductive film.

9. The method of claim 7, including the step of filling voids between said light emitting portion and subjacent portions of said conductive film with a light-transmitting fluid, whereby light transfer from said light emitting portion to said optical detecting element is maximized.

10. The method of claim 7, wherein said mounting step includes epoxy encapsulation of portions of said optical fiber and portions of said conductive film.

* * * * *